United States Patent
Tamaki et al.

[19]

[11] Patent Number: 6,007,897

[45] Date of Patent: Dec. 28, 1999

[54] FABRIC AND TOOTHED BELT USING FABRIC

[75] Inventors: Toshitaka Tamaki; Junji Yokoi, both of Nara, Japan

[73] Assignee: Unitta Company, Osaka, Japan

[21] Appl. No.: 08/976,078

[22] Filed: Nov. 21, 1997

[30] Foreign Application Priority Data

Nov. 25, 1996 [JP] Japan ................................. 8-329189

[51] Int. Cl.$^6$ ................................. B32B 3/00; F16G 1/00
[52] U.S. Cl. ................. 428/172; 428/297.4; 428/161; 442/59; 474/202; 474/266; 474/271
[58] Field of Search .................... 428/167, 156, 428/172, 297.4, 161; 74/82; 474/202, 207, 266, 271; 198/844.1, 847; 442/59

[56] References Cited

U.S. PATENT DOCUMENTS

| | | |
|---|---|---|
| 4,490,428 | 12/1984 | Long . |
| 4,501,771 | 2/1985 | Long . |
| 4,565,715 | 1/1986 | Long . |
| 4,570,566 | 2/1986 | Long . |
| 4,579,766 | 4/1986 | Long . |
| 4,622,243 | 11/1986 | Long . |
| 4,624,813 | 11/1986 | Long . |
| 4,637,940 | 1/1987 | Long . |
| 4,711,792 | 12/1987 | Long . |
| 4,753,190 | 6/1988 | Long . |
| 4,753,823 | 6/1988 | Long . |
| 4,769,260 | 9/1988 | Long . |
| 4,970,039 | 11/1990 | Long . |
| 5,209,961 | 5/1993 | Yokoi . |
| 5,609,243 | 3/1997 | Fujita et al. . |

FOREIGN PATENT DOCUMENTS

| | | |
|---|---|---|
| 0345367 | 12/1989 | European Pat. Off. . |
| 0461865 | 12/1991 | European Pat. Off. . |
| 0665390 | 8/1995 | European Pat. Off. . |
| 0719718 | 7/1996 | European Pat. Off. . |
| 7-190150 | 7/1995 | Japan . |
| 7190150 | 7/1995 | Japan . |
| 83/02909 | 9/1983 | WIPO . |

OTHER PUBLICATIONS

An English Language Abstract of JP 7–190150.
Copy of a Patent Abstract, vol. 095, No. 010, Nov. 30, 1995 of JP No. 7–190150.

*Primary Examiner*—Donald Loney
*Attorney, Agent, or Firm*—Greenblum & Bernstein, P.L.C.

[57] ABSTRACT

A toothed belt has a plurality of teeth, which are arranged in the longitudinal direction thereof, and cords embedded in a back portion of the toothed belt. A facing fabric is covered over the teeth. The fabric used for the facing fabric is coated with latex. The solid deposition of latex is adjusted to between 50 and 200 wt % with respect to the weight of the base cloth.

11 Claims, 2 Drawing Sheets

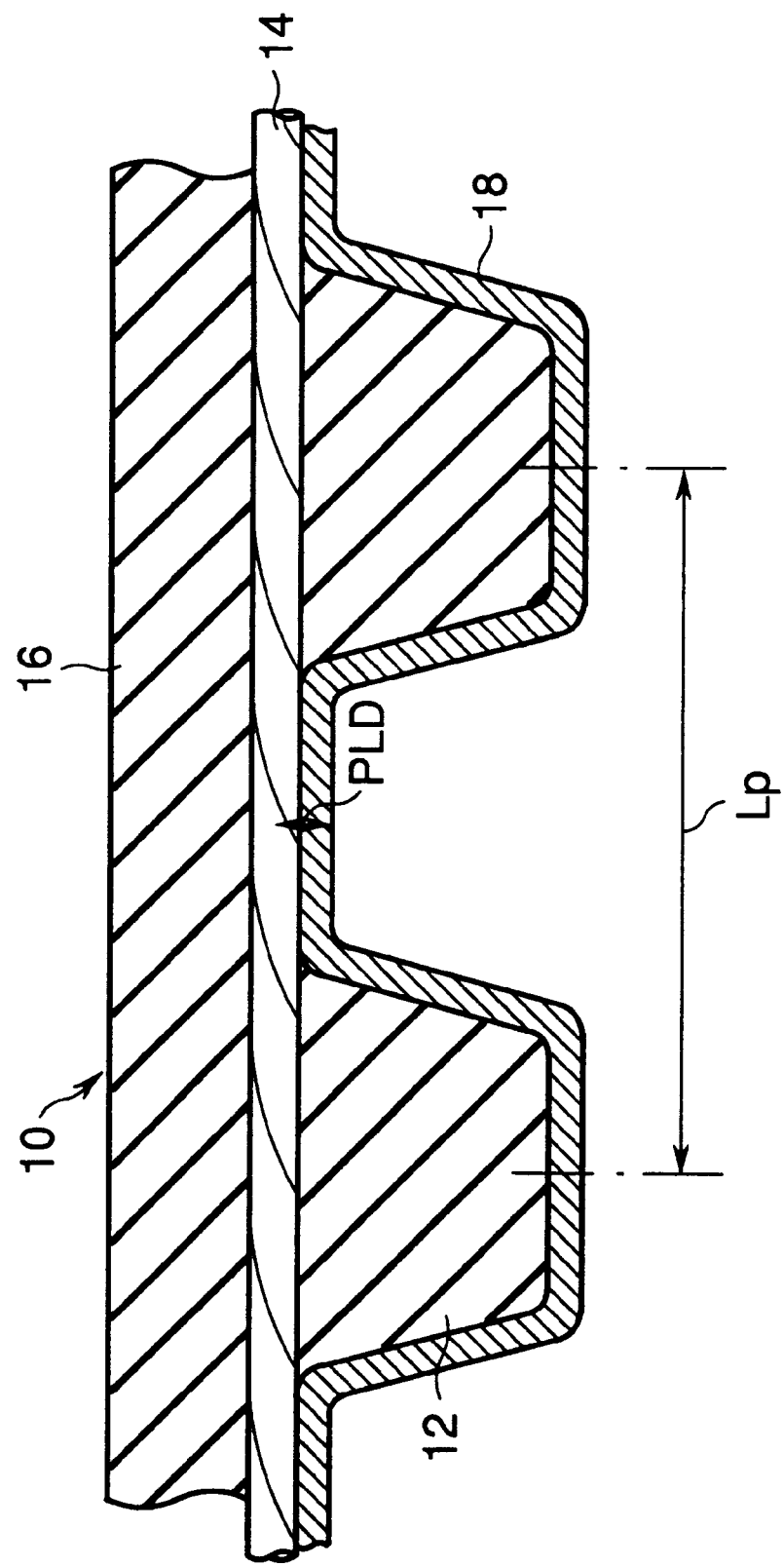

6,007,897

FABRIC AND TOOTHED BELT USING FABRIC

BACKGROUND OF THE INVENTION

1. Field of the Invention

The present invention relates to a fabric for a toothed belt used for a carriage feed of a copier or printer, positioning of an industrial robot, and so on.

2. Description of the Related Art

Teeth formed on a toothed belt are covered by an elastic fabric. Conventionally, in a manufacturing process, the fabric is treated with an RFL (resorcinol-formaldehyde-latex) solution to enable it to strongly bond with the teeth, and is then coated with rubber (rubberized). In the toothed belt having the fabric obtained by this processing method, however, the coated rubber adheres to or the tooth rubber exudes and is deposited on the surface of the fabric, thereby causing the frictional coefficient between the surface of the fabric and a pulley to rise, an increase in noise to occur, and rubber dust to be dispersed, because of friction with the pulley when the belt is run. Since tooth rubber includes carbon, which has a good electroconductivity, the rubber dust can cause electrical disturbances in office automation (OA) equipment and the like.

A toothed belt for preventing exudation of the tooth rubber to the fabric is disclosed in Japanese Unexamined Patent Publication (Kokai) No. 7-190150, for example. In this toothed belt, the fabric is treated only with an RFL solution, and further, a solid deposition of RFL, having 30 to 50 wt % with respect to the weight of the base cloth, is generated on the fabric.

If the solid deposition of the RFL solution is from 30 to 50 wt %, however, exudation of the tooth rubber is not sufficiently prevented. Conversely, if the solid deposition is increased, although the exudation of the tooth rubber becomes smaller, the elasticity of the fabric is impaired. Thus, it is difficult to form the teeth of the belt into the desired shape, especially in a toothed belt requiring a small pitch, such as one used for OA equipment.

SUMMARY OF THE INVENTION

Therefore, an object of the invention is to provide a fabric which is not impaired in elasticity, but is free from exudation of the rubber, and to provide a toothed belt using this fabric.

According to the present invention, there is provided a fabric covering a tooth surface of a plurality of teeth formed on a toothed belt, the fabric comprising first and second surfaces. The first surface is adhered to the tooth surface, and the second surface is opposite to the first surface. At least one of the first or second surfaces is treated with latex.

Further, according to the present invention, there is provided a fabric which will cover a surface of a plurality of teeth formed on a toothed belt, the fabric characterized in that it is coated on at least one of its two surfaces with latex.

Furthermore, according to the present invention, there is provided a toothed belt having a plurality of teeth along the longitudinal direction thereof, the toothed belt comprising a fabric covering the teeth. The fabric has first and second surfaces. The first surface is adhered to the teeth, and the second surface is opposite to the first surface. At least one of the first or second surfaces is treated with latex.

BRIEF DESCRIPTION OF THE DRAWINGS

The present invention will be better understood from the description of the preferred embodiments of the invention set forth below, together with the accompanying drawings, in which:

FIG. 2 is a cross-sectional view showing the toothed belt shown in FIG. 1 along the longitudinal direction.

DESCRIPTION OF THE PREFERRED EMBODIMENTS

Figure 1:
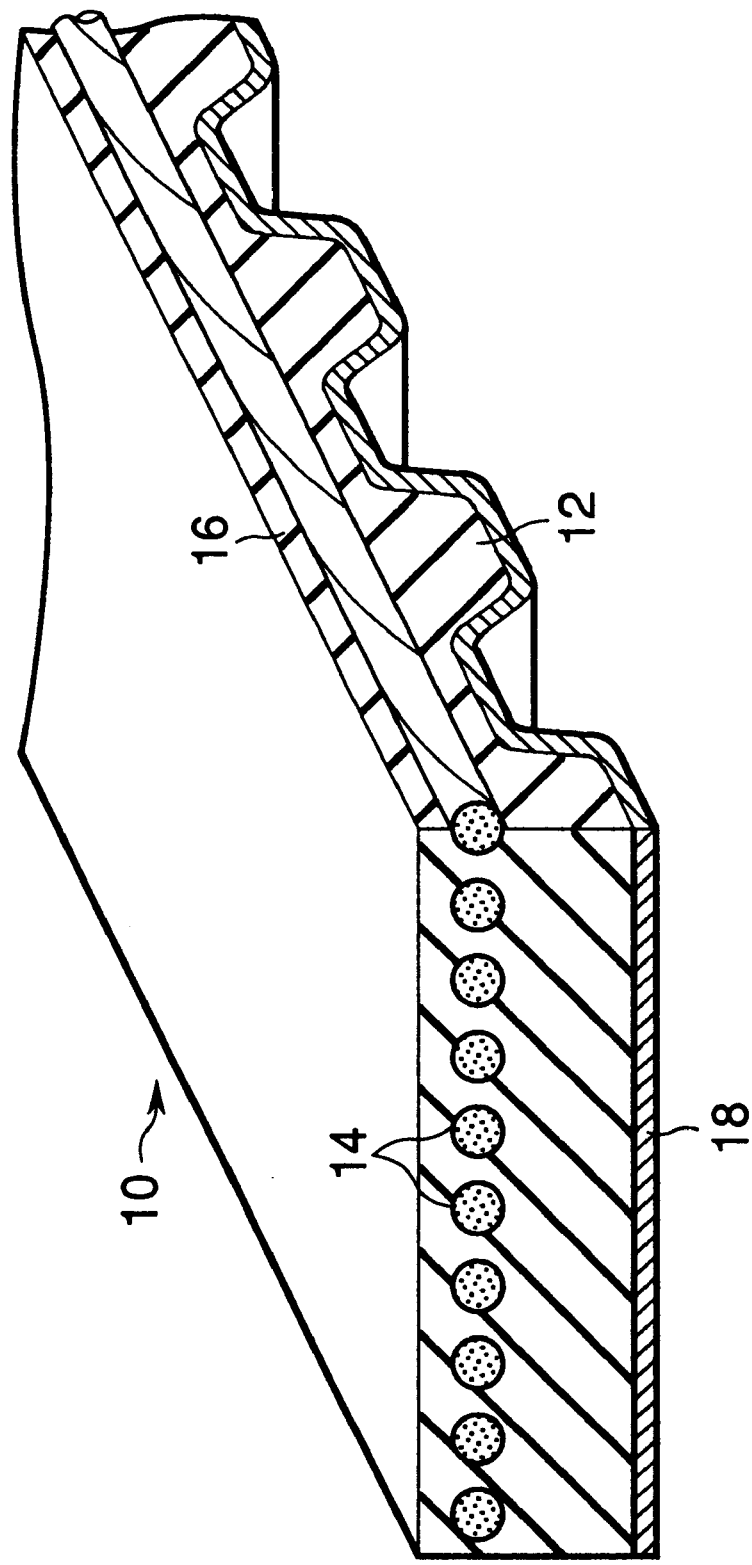
FIG. 1 is a perspective view showing a toothed belt to which an embodiment of the present invention is applied, and in which an end thereof is cut.

The present invention will be described below with reference to embodiments shown in the drawings.

FIG. 1 is a perspective view showing a cut toothed belt of one embodiment, and FIG. 2 is a longitudinal cross-sectional view of the toothed belt.

The toothed belt 10 has a plurality of teeth 12, which are formed along the longitudinal direction of the belt 10, and a back portion 16, in which cords 14 are embedded. The fabric 18 is adhered to the surface of the teeth 12. The shape of the teeth 12, when viewed from the side, though not being particularly limited, may be rounded, utilizing partial arcs, or trapezoidal or other suitable shape. Note that, in FIG. 2, Lp indicates the pitch, and PLD the pitch line differential.

The rubber stock used for the teeth 12 and the back portion 16 can be hydrogenated nitrile rubber, chlorosulfonated polyethylene, or other such rubbers having improved heat aging resistance, such as chloroprene rubber, natural rubber, styrene-butadiene rubber, etc. Blending agents such as zinc white, stearic acid, a plasticizer, an antioxidant, and so on are added to these rubbers. Sulfur, organic peroxides, and so on can be used as the vulcanizing agent. These blending agents and vulcanizing agents are not particularly limited.

Preferably, with regard to the cords 14, twisted cords are provided in which glass fibers, para-aromatic polyamide fibers, and/or other filaments are twisted together and treated with an adhesive, such as an RFL solution. The present invention is not limited to these twisted cords.

The fabric used as the facing fabric includes nylon 6, nylon 66, and so on, which may be used alone or mixed. The weft, which is extended in the belt width direction of the facing fabric, and the warp, which is extended in the belt length direction, are made of filaments or spun yarns of the above-mentioned fibers. The weave may be a plain weave, twill weave, satin weave, etc. Note that the weft need not be elastic, while the warp should have elasticity.

The fabric is first treated with latex. The type of latex is not particularly limited, but a self-cross-linking latex, which forms a flexible film, thereby not impairing the elasticity of the fabric, and which has a high film strength when forming the teeth, is preferable. The latex may be untreated latex, or may require an addition of a vulcanizing agent, vulcanizing accelerator, antioxidant, and so on, according to necessity.

In a manufacturing process, the base cloth is first immersed in a latex solution, passed through a pair of rollers to wring it out, and is then dried. The solid deposition of latex is preferably 50 to 200 wt % with respect to the weight of the base cloth.

The fabric treated with the latex is further treated with an RFL solution. The treatment step is similar to that in which the base cloth is treated with the latex, and therefore is not described in detail here. The RFL solution is comprised of an initial mixture (RF solution) of resorcinol and formaldehyde which is mixed with the latex.

The above-mentioned treated fabric is wrapped around the outer surface of a cylindrical mold, which has a predetermined toothed shape such that the circumferential direction corresponds to the elastic warp. Then, the cords are spirally wound over the fabric, and further, an unvulcanized rubber sheet, which forms the teeth and the back portion, is wrapped around the mold, covering the fabric and spirally wound cord. A vulcanizing sleeve is fitted over this to cover the entire assembly, then this is vulcanized and pressed by a steam vulcanizer. When vulcanized and pressed, the rubber sheet enters between the cords to the depressions of the mold, which causes the fabric to be stretched. Thus, teeth covered with a fabric are formed. This cylindrical belt material is then cut into a predetermined width so that the toothed belt, shown in FIG. 1, is obtained.

Below, the present invention will be explained with reference to examples and comparative examples, but the present invention is not limited by these examples.

The toothed belts of Examples 1 to 3 and Comparative Examples 1 and 2, were manufactured and compared visually for exudation of rubber. The configurations of the toothed belts are shown in Table 1.

TABLE 1

|  | Ex. 1 | Ex. 2 | Comp. Ex. 1 | Ex. 3 | Comp. Ex. 2 |
| --- | --- | --- | --- | --- | --- |
| Fabric *1 |  |  |  |  |  |
| Base cloth thickness (mm) | 0.31 | 0.31 | 0.31 | 0.78 | 0.78 |
| Weave | Piain | Plain | Plain | 2-2 twiil | 2-2 twiil |
| Latex *2 | Yes | Yes | No | Yes | No |
| Solid deposition | 100% | 100% | — | 85% | — |
| RFL solution *3 | No | Yes | Yes | Yes | Yes |
| Solid deposition | — | 35% | 35% | 25% | 25% |
| Finished thickness (mm) | 0.35 | 0.35 | 0.33 | 0.84 | 0.81 |
| Rubber stock of teeth and back portion | Rubber A*4 | Rubber A | Rubber A | Rubber A | Rubber A |
| Tooth shape | Trapezoidal | Trapezoidal | Trapezoidal | Round | Round |
| Tooth pitch (mm) | 2.032 | 2.032 | 2.032 | 8.00 | 8.00 |

*1 Fabric: Material nylon 66.
*2 Latex: CROSLENE (phonetic) NA-15 (name of product of Takeda Chemical Industries). Solid deposition is percent against weight of base cloth (wt%).
*3 RFL solution: See Table 3. The amount of solid deposition is ratio against weight of base cloth (wt%).
*4 Rubber A: See Table 2.

(1) EXAMPLE 1

For the fabric, a cloth comprised of a nylon 66 weft and warp, which were plain woven to a thickness of the base cloth of 0.31 mm, was used. The fabric was treated with only latex. The solid deposition of latex on the fabric was 100 wt % with respect to the weight of the base cloth. The thickness of the treated fabric was 0.35 mm. For the latex, a self-cross-linking latex containing a carboxyl group (CROSLENE (phonetic) NA-15 (name of product of Takeda Chemical Industries), for example) was used. The rubber stock forming the teeth and the back portion of the toothed belt of Example 1 was chloroprene rubber. The rubber compound shown in Table 2 was used as the rubber stock. The tooth shape of the belt was trapezoidal. The tooth pitch was 2.032 mm.

TABLE 2

| Rubber A | |
| --- | --- |
| Blending agent | Parts by weight |
| Chloroprene rubber | 100.0 |
| Stearic acid | 0.5 |
| Magnesium oxide | 4.0 |
| Zinc oxide | 5.0 |
| Plasticizer | 10.0 |
| Carbon black | 45.0 |
| Antioxidant *5 | 2.0 |
| Accelerator *6 | 0.5 |
| Total | 167.0 |

*5: NOCRAC PA (name of product of Ouchi Shinko Chemical Industrial Co., Ltd.)
*6: NOCCElER D (name of product of Ouchi Shinko Chemical Industrial Co., Ltd.)

TABLE 3

| Composition of RFL Solution | |
| --- | --- |
| Name of chemical | Parts by weight |
| RFL solution |  |
| Resorcinol | 17.3 |
| Formaldehyde (35%) | 13.2 |
| Water | 340.5 |
| NaOH aqueous solution (10%) | 3.7 |
| Latex*7 | 370.7 |
| Ammonia water (28%) | 30.0 |
| Water | 187.0 |
| Total | 962.4 |

*7: Neoprene Latex 650 (name of product of Du Pont-Showa Denko Co., Ltd.).

(2) EXAMPLE 2

The fabric was treated with latex and then treated with an RFL solution. The RFL solution used is described in Table 3. The solid deposition of latex on the fabric was 100 wt % with respect to the weight of the base cloth. The solid deposition of RFL was 35 wt % with respect to the weight of the base cloth. The rest of the configuration was the same as that of Example 1.

(3) EXAMPLE 3

For the fabric, a cloth comprised of a nylon 66 weft and warp, which were given a 2—2 twill weave to form a base cloth with a thickness of 0.78 mm, was used. This cloth was treated with both latex and RFL solutions. The solid deposition of latex on the fabric was 85 wt % with respect to the weight of the base cloth, while the solid deposition of RFL was 25 wt % with respect to the weight of the base cloth. The finished thickness of the fabric was 0.84 mm. The tooth shape was round, while the tooth pitch was 8.00 mm. The rest of the configuration was the same as Example 2.

(4) COMPARATIVE EXAMPLE 1

For the fabric, a cloth having a thickness of the base cloth of 0.31 mm was used. This cloth was not treated with latex, and was treated with only an RFL solution. The finished thickness of the fabric was 0.33 mm. The rest of the configuration was the same as Example 2.

(5) COMPARATIVE EXAMPLE 2

For the fabric, a cloth having a thickness of the base cloth of 0.78 mm was used. This cloth was not treated with latex, and was treated with only an RFL solution. The finished thickness of the fabric was 0.81 mm. The rest of the configuration was the same as Example 3.

TABLE 4

|  | Ex. 1 | Ex. 2 | Comp. Ex. 1 | Ex. 3 | Comp. Ex. 2 |
|---|---|---|---|---|---|
| Bonding with belt teeth | Good | Very good | Very good | Very good | Very good |
| Exudation of rubber | No | No | Yes | No | Yes |
| Results of running tests |  |  |  |  |  |
| Degree of dispersion of rubber dust |  |  |  |  |  |
| 1st running test | No | No | Yes | — | — |
| 2nd running test | — | — | — | No | Yes |
| Belt noise (dBA) |  |  |  |  |  |
| 3rd running test | 56 | 56 | 60 | — | — |
| 4th running test | — | — | — | 70 | 73 |
| Belt durability (hours) |  |  |  |  |  |
| 5th running test | 850 | Over 1000 | Over 1000 | — | — |
| 6th running test | — | — | — | 240 | 240 |

Referring to Table 4, when using a fabric coated with latex, that is, in each of Examples 1 to 3, no exudation of the rubber on the surface of the fabric was observed. Conversely, in Comparative Examples 1 and 2 using fabrics not coated with latex, exudation of rubber was recognized. Note that, in Example 1, the fabric was coated with only latex, and thus, the bond between the fabric and belt teeth was weaker than in Comparative Example 1. In the fabric of Example 2 treated with both latex and RFL solutions, despite the finished thickness of the fabric being substantially the same as that of Example 1, it was recognized that the bond with the belt teeth was good, even compared with Comparative Example 1.

The belts of Examples 1 to 3 and Comparative Examples 1 and 2 were used for running tests to evaluate their performance. The evaluation was performed to evaluate three properties during running of the belt, those being, the amount of dispersion of the rubber dust, noise and durability. The running conditions differed for the trapezoidal tooth belts (Example 1, Example 2, and Comparative Example 1) and the round tooth belts (Example 3 and Comparative Example 2). Note, that the results of the running tests are shown in Table 4. Note also, that the "-" marks in Table 4 show that no running test was performed.

Method of Testing and Method of Evaluating Degree of Dispersion of Rubber Dust of a Running Belt The belts of Examples 1 to 3 and Comparative Examples 1 and 2 were used to conduct first and second running tests. The degree of dispersion of rubber dust was evaluated visually.

A first running test was performed using the trapezoidal belts of Example 1, Example 2, and Comparative Example 1. The belts were used in a carriage feed of a commercially available printer (Japanese language serial printer PC-PR201/63 made by NEC) and run for 24 hours.

A second running test was performed using the round tooth belts of Example 3 and Comparative Example 2. A twin-shaft running tester, which was provided with a driving pulley having 22 teeth and a driven pulley having 22 teeth, was used, so that the belts ran for 24 hours under conditions of 2300 rpm for a speed of the drive pulley and a load of 23 N.m.

The results of the first and second running tests are shown in Table 4. Regarding the degree of dispersion of the rubber dust, rubber dust was observed in the comparative examples in both the trapezoidal and round tooth belts, but was not observed in the examples. This result corresponds to the presence of exudation of the rubber. Thus, it is understood that the belts of Example 1 and Example 2, being free from exudation of rubber, i.e. the belts with latex coated on the fabric, could prevent dispersion of rubber dust.

Method of Testing and Method of Evaluating Noise of a Running Belt

Third and fourth running tests were performed using the belts of Examples 1 to 3 and Comparative Examples 1 and 2 to evaluate the noise based on the noise level generated from the belts. The noise level was measured using the A scale of a noise meter, that is, a scale close to human hearing, and was indicated in dBA.

The third running test was performed using the trapezoidal tooth belts of Example 1, Example 2, and Comparative Example 1. A twin-shaft running tester, which was provided with a driving pulley having 30 teeth and a driven pulley having 30 teeth, was used, and the belts run under conditions of 1 to 3000 rpm for a speed of the drive pulley and no load. A microphone was placed at a position 100 mm from the belt at the center of the span between the two shafts to measure the noise level of the belt.

The fourth running test was performed using the round tooth belts of Example 3 and Comparative Example 2. A twin-shaft running tester, which is provided with a driving pulley having 22 teeth and a driven pulley having 22 teeth, was used, and the belts run under conditions of 1 to 3000 rpm for a speed of the drive pulley and no load. A microphone was placed at a position 100 mm from the belt, at the center of the span between the two shafts, to measure the noise level of the belt.

The results of the third and fourth running tests are shown in Table 4. The results of the two running tests correspond to the presence of exudation of rubber. Compared with the belts of the comparative examples, it was found that the belts of the examples were less noisy. This is because, in the belts of the examples, there is no exudation of rubber on the surface of the fabric, so the friction with the pulley at the time of being driven is reduced, and smooth transmission of power is possible.

Method of Testing and Method of Evaluating Durability of a Running Belt

The belts of Examples 1 to 3 and Comparative Examples 1 to 2 were subjected to the fifth and sixth running tests. The time of running from the start of running to when the belt teeth broke at the bases and running was no longer possible was measured to evaluate the durability.

The fifth running test was performed using the trapezoidal tooth belts of Example 1, Example 2, and Comparative Example 1. The belts were run using a twin-shaft running tester, which was provided with a driving pulley having 14 teeth and a driven pulley having 14 teeth, under conditions of 9000 rpm for a speed of the driving pulley and a load of 0.1 N.m.

The sixth running test was performed using the round tooth belts of Example 3 and Comparative Example 2. The belts were run using a twin-shaft running tester, which was provided with a driving pulley having 22 teeth and a driven pulley having 22 teeth, under conditions of 2300 rpm for a speed of the driving pulley and a load of 23 N.m.

The results of the fifth and sixth driving tests are shown in Table 4. The durability of the belt corresponds to the degree of bonding with the belt teeth. The belt of Example 1, in which the bonding with the belt teeth was poor, was found to be inferior in durability to the belts of Example 2 and Comparative Example 1. Further, negligible difference was observed in the durability between the belt of Example 3 and the belt of Comparative Example 2. That is, a toothed belt using a fabric, which was treated not only with a latex solution, but also with an RFL solution, is good in bonding with the belt teeth, and has a long service life.

In the toothed belt of the embodiment of the present invention, since the facing fabric is treated with latex, the spaces in the weave of the facing fabric are covered with latex and exudation of rubber can be prevented. Therefore, when running the belt, it was recognized that no rubber dust was generated due to lower friction with the pulley and, consequently, the noise was reduced.

Note that, although, in the examples described above, the base cloth is immersed in a latex solution so that both of the surfaces of the base cloth are treated with latex, only one of the surfaces may require application of latex.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-329189 (filed on Nov. 25, 1996) which is expressly incorporated herein, by reference, in its entirety.

We claim:

1. A fabric covering a tooth surface of a plurality of teeth formed on a toothed belt, said fabric comprising:

first and second surfaces, said first surface being adhered to said tooth surface, said second surface being opposite to said first surface, at least one of said first and second surfaces being treated with latex; and an amount of deposition of said latex is approximately 50 to 200 wt % with respect to a weight of a base cloth forming said fabric.

2. A fabric according to claim 1, wherein said amount is approximately 85 to 100 wt % with respect to a weight of a base cloth forming said fabric.

3. A fabric according to claim 1, wherein said latex is a self-cross-linking latex containing a carboxyl group.

4. A fabric according to claim 1, wherein said fabric is coated with resorcinol-formaldehyde-latex after being coated with said latex.

5. A fabric according to claim 4, wherein an amount of solid deposition of said resorcinol-formaldehyde-latex is approximately 25 to 35 wt % with respect to a weight of a base cloth forming said fabric.

6. A fabric to cover a surface of a plurality of teeth formed on a toothed belt, said fabric comprising two surfaces, and a coating of latex on at least one of said two surfaces; and an amount of deposition of said latex is approximately 50 to 200 wt % with respect to a weight of a base cloth forming said fabric.

7. A toothed belt having a plurality of teeth along the longitudinal direction thereof, said toothed belt comprising:

a fabric covering said teeth, said fabric having first and second surfaces, said first surface being adhered to said teeth, said second surface being opposite to said first surface, at least one of said first and second surfaces being treated with latex; and an amount of deposition of said latex is approximately 50 to 200 wt % with respect to a weight of a base cloth forming said fabric.

8. A toothed belt according to claim 7, wherein an amount of deposition of said latex is approximately 85 to 100 wt % with respect to a weight of a base cloth forming said fabric.

9. A toothed belt according to claim 7, wherein said latex is a self-cross-linking latex containing a carboxyl group.

10. A toothed belt according to claim 7, wherein said fabric is coated with resorcinol-formaldehyde-latex after being coated with said latex.

11. A toothed belt according to claim 10, wherein an amount of solid deposition of said resorcinol-formaldehyde-latex is approximately 25 to 35 wt % with respect to a weight of a base cloth forming said fabric.

* * * * *